(12) United States Patent
Xing et al.

(10) Patent No.: US 10,481,466 B2
(45) Date of Patent: Nov. 19, 2019

(54) OPTICAL SWITCH

(71) Applicant: Huawei Technologies Co., Ltd., Shenzhen, Guangdong (CN)

(72) Inventors: Jiejiang Xing, Wuhan (CN); Ming Li, Wuhan (CN); Xin Tu, Wuhan (CN)

(73) Assignee: HUAWEI TECHNOLGIES CO., LTD., Shenzhen (CN)

(*) Notice: Subject to any disclaimer, the term of this patent is extended or adjusted under 35 U.S.C. 154(b) by 0 days.

(21) Appl. No.: 16/179,631

(22) Filed: Nov. 2, 2018

(65) Prior Publication Data

US 2019/0086764 A1    Mar. 21, 2019

Related U.S. Application Data

(63) Continuation of application No. PCT/CN2016/104051, filed on Oct. 31, 2016.

(30) Foreign Application Priority Data

May 4, 2016  (CN) .......................... 2016 1 0288760
Jul. 29, 2016  (CN) .......................... 2016 1 0619006

(51) Int. Cl.
  *G02F 1/313*  (2006.01)
  *G02B 6/125*  (2006.01)
  (Continued)

(52) U.S. Cl.
  CPC ........... *G02F 1/3138* (2013.01); *G02B 6/125* (2013.01); *G02F 1/0147* (2013.01); *H05B 3/26* (2013.01);
  (Continued)

(58) Field of Classification Search
  CPC .................................................. G02F 1/3138
  See application file for complete search history.

(56) References Cited

U.S. PATENT DOCUMENTS 4,846,540 A * 7/1989 Kapon ............... G02B 6/12007
                                                385/45
5,033,811 A * 7/1991 Yanagawa ............. G02F 1/3138
                                                385/16
(Continued)

FOREIGN PATENT DOCUMENTS

CN         1182484 A      5/1998
CN         1221496 A      6/1999
(Continued)

OTHER PUBLICATIONS

David J. Thomson et al, "Total Internal Reflection Optical Switch in SOI With Defect Engineered Barrier Region", Journal of Lightwave Technology, vol. 28, Issue 17, Sep. 1, 2010, 9 pages.

(Continued)

*Primary Examiner* — Rhonda S Peace
(74) *Attorney, Agent, or Firm* — Huawei Technologies Co., Ltd.

(57) ABSTRACT

The present application discloses an optical switch, including a first optical waveguide, a second optical waveguide, and a first heater, where a place at which a distance between the first optical waveguide and the second optical waveguide is the smallest is a junction; the first heater is adjacent to the third optical sub-waveguide; and there is a first dielectric material between the first heater and the third optical sub-waveguide, and there is a second dielectric material between the third optical sub-waveguide and the fourth optical sub-waveguide, where a thermal conductivity of the first dielectric material is greater than a thermal conductivity of the second dielectric material. The optical switch has advantages such as high heating efficiency, a small quantity of heaters, and simple control.

18 Claims, 7 Drawing Sheets

(51) Int. Cl.
*G02F 1/01* (2006.01)
*H05B 3/26* (2006.01)
(52) U.S. Cl.
CPC .. *H05B 2203/005* (2013.01); *H05B 2203/035* (2013.01)

(56) References Cited

U.S. PATENT DOCUMENTS

| | | | |
|---|---|---|---|
| 5,181,262 A | 1/1993 | Gerardus et al. | |
| 5,706,374 A | 1/1998 | Vinchant | |
| 6,094,516 A * | 7/2000 | Nolting | G02B 6/125 385/39 |
| 6,233,377 B1 | 5/2001 | Keil et al. | |
| 6,345,131 B1 | 2/2002 | Jang et al. | |
| 7,184,631 B2 * | 2/2007 | Mitomi | G02B 6/1228 385/39 |
| 8,055,106 B2 * | 11/2011 | Han | G02B 6/125 385/14 |
| 9,329,340 B2 * | 5/2016 | Kondou | G02B 6/125 |
| 2003/0210855 A1 | 11/2003 | Sakuma et al. | |
| 2005/0052726 A1* | 3/2005 | Nakagawa | G02B 6/125 359/333 |
| 2006/0165340 A1 | 7/2006 | Wu | |
| 2007/0086704 A1 | 4/2007 | Ishikawa et al. | |
| 2019/0086764 A1* | 3/2019 | Xing | G02F 1/313 |

FOREIGN PATENT DOCUMENTS

| | | |
|---|---|---|
| CN | 1278605 A | 1/2001 |
| CN | 1441305 A | 9/2003 |
| CN | 1540427 A | 10/2004 |
| CN | 1651950 A | 8/2005 |
| CN | 1811499 A | 8/2006 |
| CN | 1952708 A | 4/2007 |
| CN | 102944913 A | 2/2013 |
| EP | 1787163 B1 | 11/2010 |
| WO | 96/33441 A1 | 10/1996 |
| WO | 02/44777 A1 | 6/2002 |
| WO | WO-0244777 A1 * | 6/2002 ............. G02B 6/122 |

OTHER PUBLICATIONS

Y.L. Liu et al, "Silicon 1×2 digital optical switch using plasma dispersion", Electronics Letters, vol. 30, Issue 2 , Jan. 20, 1994, 2 pages.
F. Gan et al, "Maximizing the Thermo-Optic Tuning Range of Silicon Photonic Structures", 2007 Photonics in Switching, Sep. 10, 2007, 2 pages.
Ken Tanizawa et al, "Ultra-compact 32×32 strictly-non-blocking Si-wire optical switch with fan-out LGA interposer", Optics Express, vol. 23, No. 13, Jun. 29, 2015, 8 pages.
R. Krähenbühl et al, "Performance and Modeling of Advanced Ti : LiNbO3 Digital Optical Switches", Journal of Lightwave Technology, vol. 20, No. 1, Jan. 2002, 8 pages.
Michael R. Watts et al, "Adiabatic thermo-optic Mach-Zehnder switch", Optics Letters, vol. 38, No. 5, Mar. 1, 2013, 3 pages.
"IRIS Project Deliverable 8.1, First Scientific Report", Feb. 4, 2015, 55 pages.

* cited by examiner

OPTICAL SWITCH

CROSS-REFERENCE TO RELATED APPLICATIONS

This application is a continuation of International Application No. PCT/CN2016/104051 filed on Oct. 31, 2016, which claims priorities to Chinese Patent Application No. 201610288760.6 filed on May 4, 2016 and Chinese Patent Application No. 201610619006.6 filed on Jul. 29, 2016. The disclosures of the aforementioned applications are hereby incorporated by reference in their entireties.

TECHNICAL FIELD

The present application relates to the field of all-optical switching, and in particular, to an optical switch with high heating efficiency and low insertion loss.

BACKGROUND

With development of big data and cloud computing, a capacity of optical switching at a data center is increasing day by day, and demands for a scale and a speed of an optical switch array are increasing accordingly. A silicon-based optical switch process is compatible with a mature Complementary Metal Oxide Semiconductor (CMOS) process, and a silicon-based optical switch has advantages such as low costs and high integration. Therefore, it is easy to implement a large-scale optical switch array. In addition, under a thermo-optic effect of a silicon material, a switching speed of an optical switch may reach an order of microseconds. For example, a 32×32 silicon-based interferometric thermal optical switch is described in a paper "Ultra-compact 32×32 strictly-non-blocking Si-wire optical switch with fan-out LGA interposer" in Optics Express, vol. 23, no. 13, #240124, June 2015, and a switching time of the 32×32 silicon-based interferometric thermal optical switch is 30 microseconds. However, as a driving power increases, signal light of such an interferometric optical switch unit that is based on a Mach Zehnder Interferometer (MZI) structure is periodically output alternately at two ports. In addition, due to a process error, an initial state of the interferometric optical switch unit is random. Therefore, operating points of switching states of the optical switch unit need to be determined one by one. Usually, an integrated optical detector is used to determine the operating point. This increases control difficulty substantially, and limits application of the interferometric optical switch unit.

A switching state of a digital optical switch is a stable state. That is, as a driving power increases, signal light is output from only one port, instead of being periodically output alternately at two ports as in an interferometric device. Process tolerance is high, and control difficulty is low. However, the thermo-optic effect of the silicon material is relatively weak, and therefore a large temperature difference cannot be obtained by using a traditional heating method, and an effective refractive index change caused is only 0.001. As a result, a component required for implementing the silicon-based optical switch is very long (usually on an order of centimeters), and a loss is relatively large. This is unfavorable to integration of a large-scale silicon-based optical switch array. Therefore, it is important in a future all-optical switching technology to implement a silicon-based optical switch with high heating efficiency, a compact structure, and a low insertion loss.

SUMMARY

The present disclosure provides a compact optical switch with high heating efficiency and low insertion loss, so as to resolve problems of low heating efficiency, a large component length, and large loss of an existing silicon-based optical switch.

According to a first aspect, an optical switch is provided, including a first optical waveguide, a second optical waveguide, and a first heater, where a place at which a distance between the first optical waveguide and the second optical waveguide is the smallest is a junction, the first optical waveguide includes a first optical sub-waveguide and a third optical sub-waveguide, and the second optical waveguide includes a second optical sub-waveguide and a fourth optical sub-waveguide; the first heater is adjacent to the third optical sub-waveguide; and there is a first dielectric material between the first heater and the third optical sub-waveguide, and there is a second dielectric material between the third optical sub-waveguide and the fourth optical sub-waveguide, where a thermal conductivity of the first dielectric material is greater than a thermal conductivity of the second dielectric material.

In this embodiment of the present disclosure, the first dielectric material is used for heat transfer, the second dielectric material is used for heat insulation, and the thermal conductivity of the first dielectric material is greater than the thermal conductivity of the second dielectric material. This may improve heating efficiency, increase a temperature difference between the third optical sub-waveguide and the fourth optical sub-waveguide, reduce a size of a component, and help integration of a large-scale optical switch array.

With reference to the first aspect, in a first possible implementation of the first aspect, if the first heater is operating, a temperature of the third optical sub-waveguide at a place that is at a distance from the junction is higher than a temperature of the third optical sub-waveguide at a place that is near the junction. In this embodiment of the present disclosure, evolution of an adiabatic mode may be implemented, optical coupling efficiency may be improved, and loss and crosstalk may be reduced.

With reference to the first possible implementation of the first aspect, in a second possible implementation of the first aspect, the first heater includes a first heating resistor, a second heating resistor, a first electrode, a second electrode, and a third electrode; the first heating resistor is connected to the first dielectric material, and the first heating resistor is located between the first electrode and the second electrode; the second heating resistor is connected to the first dielectric material, and the second heating resistor is located between the second electrode and the third electrode; and a distance between the second electrode and the junction is greater than a distance between the first electrode and the junction, a distance between the third electrode and the junction is greater than the distance between the second electrode and the junction, the first electrode and the third electrode have a same polarity, and the first electrode and the second electrode have opposite polarities, where a distance between the first electrode and the second electrode is greater than a distance between the second electrode and the third electrode. In this embodiment of the present disclosure, a temperature difference between the third optical sub-waveguide and the fourth optical sub-waveguide may begin to gradually increase from the junction, to implement evolution of an adiabatic mode, improve optical coupling efficiency, and reduce loss and crosstalk.

With reference to the first possible implementation of the first aspect, in a third possible implementation of the first aspect, the first heater includes a first heating resistor, a second heating resistor, a first electrode, a second electrode, and a third electrode; the first heating resistor is connected to the first dielectric material, and the first heating resistor is located between the first electrode and the second electrode; the second heating resistor is connected to the first dielectric material, and the second heating resistor is located between the second electrode and the third electrode; and a distance between the second electrode and the junction is greater than a distance between the first electrode and the junction, a distance between the third electrode and the junction is greater than the distance between the second electrode and the junction, the first electrode and the third electrode have a same polarity, and the first electrode and the second electrode have opposite polarities, where cross sections of the first heating resistor and the second heating resistor at a place that is at a distance from the junction are larger than cross sections of the first heating resistor and the second heating resistor at a place that is near the junction, and the cross sections are perpendicular to a transmission direction of a current.

With reference to any one of the first to the third possible implementations of the first aspect, in a fourth possible implementation of the first aspect, the optical switch further includes a second heater, where the second heater is adjacent to the third optical sub-waveguide, there is the first dielectric material between the second heater and the third optical sub-waveguide, a distance between the second heater and the junction is greater than a distance between the first heater and the junction, and a heating power of the second heater is greater than a heating power of the first heater.

With reference to any one of the first to the fourth possible implementations of the first aspect, in a fifth possible implementation of the first aspect, a distance between the first heater and the third optical sub-waveguide at a place that is at a distance from the junction is less than a distance between the first heater and the third optical sub-waveguide at a place that is near the junction.

With reference to any one of the first aspect or the first to the fifth possible implementations of the first aspect, in a sixth possible implementation of the first aspect, being adjacent to the third optical sub-waveguide specifically includes being on an outer side of or above the third optical sub-waveguide, where the outer side of the third optical sub-waveguide is a side not adjacent to the fourth optical sub-waveguide. In this embodiment of the present disclosure, the first heater and the second heater may be located on the outer side of the third optical sub-waveguide, so that the first heater and the second heater are farther away from the fourth optical sub-waveguide, and a temperature difference is larger between the third optical sub-waveguide and the fourth optical sub-waveguide.

With reference to any one of the first aspect or the first to the sixth possible implementations of the first aspect, in a seventh possible implementation of the first aspect, when the first heater is operating, an effective refractive index of the third optical sub-waveguide is greater than an effective refractive index of the fourth optical sub-waveguide, and when the first heater is not operating, an effective refractive index of the third optical sub-waveguide is less than an effective refractive index of the fourth optical sub-waveguide.

With reference to the first aspect, in an eighth possible implementation of the first aspect, the first optical waveguide and the second optical waveguide have a same height, a width of the first optical sub-waveguide is greater than a width of the second optical sub-waveguide, and a width difference between the first optical sub-waveguide and the second optical sub-waveguide at a place that is at a distance from the junction is greater than a width difference between the first optical sub-waveguide and the second optical sub-waveguide at a place that is near the junction; and a width of the third optical sub-waveguide is less than a width of the fourth optical sub-waveguide, and a width difference between the third optical sub-waveguide and the fourth optical sub-waveguide at a place that is at a distance from the junction is greater than a width difference between the third optical sub-waveguide and the fourth optical sub-waveguide at a place that is near the junction. In this embodiment of the present disclosure, only one heater is required, control is simple, and power consumption is low.

With reference to the first aspect, in a ninth possible implementation of the first aspect, the first optical waveguide and the second optical waveguide have a same height, a width of the first optical sub-waveguide is less than a width of the second optical sub-waveguide, and a width difference between the first optical sub-waveguide and the second optical sub-waveguide at a place that is at a distance from the junction is greater than a width difference between the first optical sub-waveguide and the second optical sub-waveguide at a place that is near the junction; and a width of the third optical sub-waveguide is less than a width of the fourth optical sub-waveguide, and a width difference between the third optical sub-waveguide and the fourth optical sub-waveguide at a place that is at a distance from the junction is greater than a width difference between the third optical sub-waveguide and the fourth optical sub-waveguide at a place that is near the junction.

With reference to the first aspect, in a tenth possible implementation of the first aspect, the first optical waveguide and the second optical waveguide have a same height, a width of the first optical sub-waveguide is greater than a width of the second optical sub-waveguide, and a width difference between the first optical sub-waveguide and the second optical sub-waveguide at a place that is at a distance from the junction is greater than a width difference between the first optical sub-waveguide and the second optical sub-waveguide at a place that is near the junction; and widths of the third optical sub-waveguide and the fourth optical sub-waveguide remain unchanged.

With reference to the first aspect, in an eleventh possible implementation of the first aspect, the first optical waveguide and the second optical waveguide have a same width, a height of the first optical sub-waveguide is greater than a height of the second optical sub-waveguide, and a width difference between the first optical sub-waveguide and the second optical sub-waveguide at a place that is at a distance from the junction is greater than a width difference between the first optical sub-waveguide and the second optical sub-waveguide at a place that is near the junction; and a height of the third optical sub-waveguide is less than a height of the fourth optical sub-waveguide, and a height difference between the third optical sub-waveguide and the fourth optical sub-waveguide at a place that is at a distance from the junction is greater than a height difference between the third optical sub-waveguide and the fourth optical sub-waveguide at a place that is near the junction.

With reference to the first aspect, in a twelfth possible implementation of the first aspect, the first optical waveguide and the second optical waveguide have a same width, a height of the first optical sub-waveguide is less than a height of the second optical sub-waveguide, and a width difference between the first optical sub-waveguide and the second optical sub-waveguide at a place that is at a distance from the junction is greater than a width difference between the first optical sub-waveguide and the second optical sub-waveguide at a place that is near the junction; and a height of the third optical sub-waveguide is less than a height of the fourth optical sub-waveguide, and a height difference between the third optical sub-waveguide and the fourth optical sub-waveguide at a place that is at a distance from the junction is greater than a height difference between the third optical sub-waveguide and the fourth optical sub-waveguide at a place that is near the junction.

With reference to the first aspect, in a thirteenth possible implementation of the first aspect, the first optical waveguide and the second optical waveguide have a same width, a height of the first optical sub-waveguide is greater than a height of the second optical sub-waveguide, and a width difference between the first optical sub-waveguide and the second optical sub-waveguide at a place that is at a distance from the junction is greater than a width difference between the first optical sub-waveguide and the second optical sub-waveguide at a place that is near the junction; and heights of the third optical sub-waveguide and the fourth optical sub-waveguide remain unchanged.

With reference to the tenth or the thirteenth possible implementation of the first aspect, in a fourteenth possible implementation of the first aspect, the optical switch further includes a third heater, where the third heater is adjacent to the fourth optical sub-waveguide. In this embodiment of the present disclosure, two heaters are required. Compared with the previous embodiment in which only one heater is required, under a condition of a same size, this embodiment of the present disclosure has a lower requirement for heater temperatures, and is easier to implement.

With reference to the fourteenth possible implementation of the first aspect, in a fifteenth possible implementation of the first aspect, when the first heater is operating and the third heater is not operating, the effective refractive index of the third optical sub-waveguide is greater than the effective refractive index of the fourth optical sub-waveguide; and when the first heater is not operating and the third heater is operating, the effective refractive index of the third optical sub-waveguide is less than the effective refractive index of the fourth optical sub-waveguide.

With reference to the fourteenth or the fifteenth possible implementation of the first aspect, in a sixteenth possible implementation of the first aspect, being adjacent to the fourth optical sub-waveguide specifically includes being on an outer side of or above the fourth optical sub-waveguide, where the outer side of the fourth optical sub-waveguide is a side not adjacent to the third optical sub-waveguide. In this embodiment of the present disclosure, the third heater may be located on the outer side of the fourth optical sub-waveguide, so that the third heater is farther away from the third optical sub-waveguide, and a temperature difference is larger between the third optical sub-waveguide and the fourth optical sub-waveguide.

With reference to any one of the fourteenth to the sixteenth possible implementations of the first aspect, in a seventeenth possible implementation of the first aspect, there is the first dielectric material between the third heater and the fourth optical sub-waveguide. The thermal conductivity of the first dielectric material is high and may improve heating efficiency.

In the embodiments of the present disclosure, the first dielectric material is used for heat transfer, the second dielectric material is used for heat insulation, and the thermal conductivity of the first dielectric material is greater than the thermal conductivity of the second dielectric material. This improves heating efficiency, increases a temperature difference between the third optical sub-waveguide and the fourth optical sub-waveguide, reduces a size of a component, and helps integration of a large-scale optical switch array.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 6($a$) shows a light field distribution diagram of fundamental mode light when a first heater is not operating according to another embodiment of the present disclosure;

FIG. 6($b$) shows a light field distribution diagram of first-order mode light when a first heater is not operating according to another embodiment of the present disclosure;

FIG. 6($c$) shows a light field distribution diagram of fundamental mode light when a first heater is operating according to another embodiment of the present disclosure;

FIG. 6($d$) shows a light field distribution diagram of first-order mode light when a first heater is operating according to another embodiment of the present disclosure;

DETAILED DESCRIPTION

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

In the following description, to illustrate rather than limit, specific details such as a particular system structure, an interface, and a technology are provided to make a thorough understanding of the present disclosure. However, a person skilled in the art should know that the present disclosure may be practiced in other embodiments without these specific details. In other cases, detailed descriptions of well-known apparatuses, circuits, and methods are omitted, so that the present disclosure is described without being obscured by unnecessary details.

In the embodiments of the present disclosure, ordinal numbers such as "first", "second", "third", and "fourth" should be understood as being used merely for distinguishing, unless the ordinal numbers do mean order according to context.

With the development of technologies such as Dense Wavelength Division Multiplexing (DWDM), a speed and a capacity of information transmission in a fiber communications link are increasing day by day, and demands for a speed and a capacity of information interchange in an optical communications network (for example, application scenarios such as a metropolitan area network or a data center) are increasing accordingly. Therefore, all-optical switching becomes a trend of development. An optical switch is a key component for implementing an all-optical switching system. The optical switch may implement functions of an all-optical layer such as route selection, wavelength selection, optical cross-connection, and self-healing protection. A silicon-based optical switch is compatible with a CMOS process and has advantages such as low costs and high integration. Therefore, it is easy to implement a large-scale optical switch array. The silicon-based optical switch mainly includes a silicon-based interferometric optical switch and a silicon-based digital optical switch. The silicon-based digital optical switch has a high process tolerance and is easy to control, and therefore is applied widely.

Figure 1:
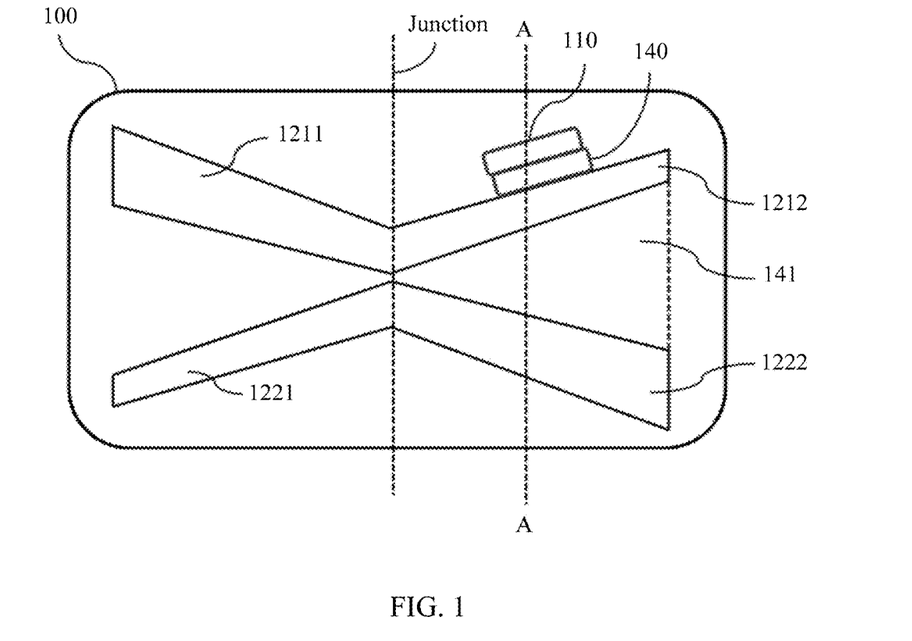
FIG. 1 shows a top view of a digital optical switch according to an embodiment of the present disclosure.
Figure 2:
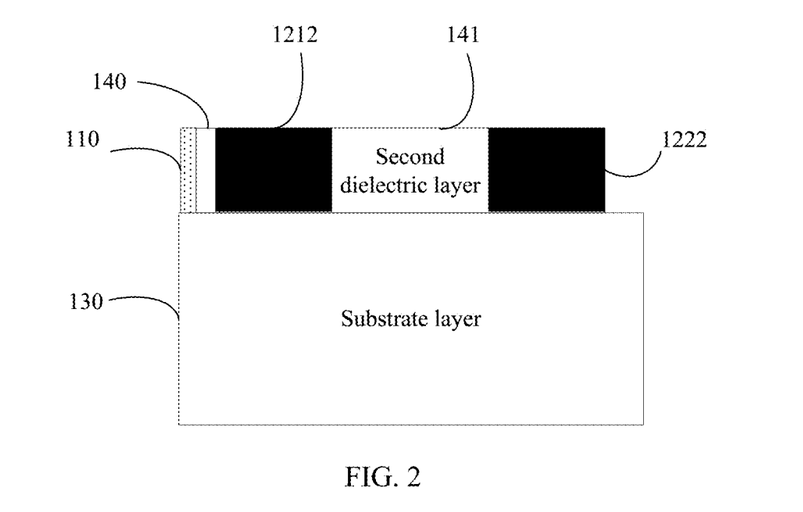
FIG. 2 shows a cross-sectional view of a digital optical switch along an A-A position in FIG. 1 according to an embodiment of the present disclosure.

An embodiment of the present disclosure provides a silicon-based digital optical switch 100. As shown in FIG. 1 and FIG. 2, the silicon-based digital optical switch 100 includes a substrate layer 130, a waveguide layer 120, and a first heater 110. The substrate layer 130 is located under the waveguide layer 120. The waveguide layer 120 is located above the substrate layer 130, and includes a first optical waveguide 121 and a second optical waveguide 122. A distance between the first optical waveguide 121 and the second optical waveguide 122 first decreases and then increases. A place at which the distance between the first optical waveguide 121 and the second optical waveguide 122 is the smallest is a junction. The first optical waveguide 121 includes a first optical sub-waveguide 1211 and a third optical sub-waveguide 1212. The second optical waveguide 122 includes a second optical sub-waveguide 1221 and a fourth optical sub-waveguide 1222. A distance between the first optical sub-waveguide 1211 and the second optical sub-waveguide 1221 gradually decreases until reaching a minimum at the junction. A distance between the third optical sub-waveguide 1212 and the fourth optical sub-waveguide 1222 gradually increases from the junction. The first heater 110 is adjacent to the third optical sub-waveguide 1212. There is a first dielectric material 140 between the first heater 110 and the third optical sub-waveguide 1212. There is a second dielectric material 141 between the third optical sub-waveguide 1212 and the fourth optical sub-waveguide 1222. A thermal conductivity of the first dielectric material 140 is greater than a thermal conductivity of the second dielectric material 141.

That is, the optical switch 100 includes the first optical waveguide 121, the second optical waveguide 122, and the first heater 110. The place at which the distance between the first optical waveguide 121 and the second optical waveguide 122 is the smallest is the junction. The first optical waveguide 121 includes the first optical sub-waveguide 1211 and the third optical sub-waveguide 1212. The second optical waveguide 122 includes the second optical sub-waveguide 1221 and the fourth optical sub-waveguide 1222. The first heater 110 is adjacent to the third optical sub-waveguide 1212. There is the first dielectric material 140 between the first heater 110 and the third optical sub-waveguide 1212. There is the second dielectric material 141 between the third optical sub-waveguide 1212 and the fourth optical sub-waveguide 1222. The thermal conductivity of the first dielectric material 140 is greater than the thermal conductivity of the second dielectric material.

A material with a high thermal conductivity is used as the first dielectric material 140, to reduce heat dissipation and improve heating efficiency. A material with a low thermal conductivity is used as the second dielectric material 141, to further reduce dissipation of heat in the third optical sub-waveguide 1212, increase a difference between effective refractive indexes of the third optical sub-waveguide 1212 and the fourth optical sub-waveguide 1222, and further reduce a component length. Simulation shows that in this embodiment of the present disclosure, the difference between the effective refractive indexes of the third optical sub-waveguide 1212 and the fourth optical sub-waveguide 1222 may reach 0.01, and the component length may be shortened to 1 mm. This helps integration of a silicon-based large-scale digital optical switch array.

Specifically, the material with a high thermal conductivity such as aluminum oxide (Al2O3) or silicon (Si) may be used as the first dielectric material 140. Thermal conductivities of Al2O3 and Si are 130 and 35, respectively, in a unit of watts/meter*degree (W/m*K), representing heat that is transferred through an area of one square meter within one second when a material is 1 meter thick and a temperature difference between surfaces of two sides of the material is one degree. The material with a low thermal conductivity such as silicon dioxide (SiO2) or air may be used as the second dielectric material 141. Thermal conductivities of SiO2 and air are 1.4 W/m*K and 0.023 W/m*K, respectively. The first heater 110 may be a metal heater, or a silicon doped heater, or the like. This is not limited in this embodiment of the present disclosure.

Optionally, in another embodiment, the distance between the first optical waveguide 121 and the second optical waveguide 122 first decreases and then increases. That is, a distance between the first optical waveguide 121 and the second optical waveguide 122 at a place that is at a distance from the junction is greater than a distance between the first optical waveguide 121 and the second optical waveguide 122 at a place that is near the junction. An optical coupling relationship is formed at the junction, where the first optical waveguide 121 and the second optical waveguide 122 are not in contact. This reduces a requirement for a manufacturing process. Specifically, a minimum distance between the first optical waveguide 121 and the second optical waveguide 122 may be 100 nm. A low-cost CMOS process can be used, and the requirement for the manufacturing process is reduced.

Optionally, in another embodiment, when the first heater 110 is operating, a temperature difference between the third optical sub-waveguide 1212 and the fourth optical sub-waveguide 1222 gradually increases from the junction. That is, a temperature of the third optical sub-waveguide 1212 at a place that is at a distance from the junction is higher than a temperature of the third optical sub-waveguide 1212 at a place that is near the junction, and a temperature difference between the third optical sub-waveguide 1212 and the fourth optical sub-waveguide 1222 at a place that is at a distance from the junction is greater than a temperature difference between the third optical sub-waveguide 1212 and the fourth optical sub-waveguide 1222 at a place that is near the junction. In this way, evolution of an adiabatic mode is implemented, optical coupling efficiency may be improved, and loss and crosstalk may be reduced.

Figure 3:
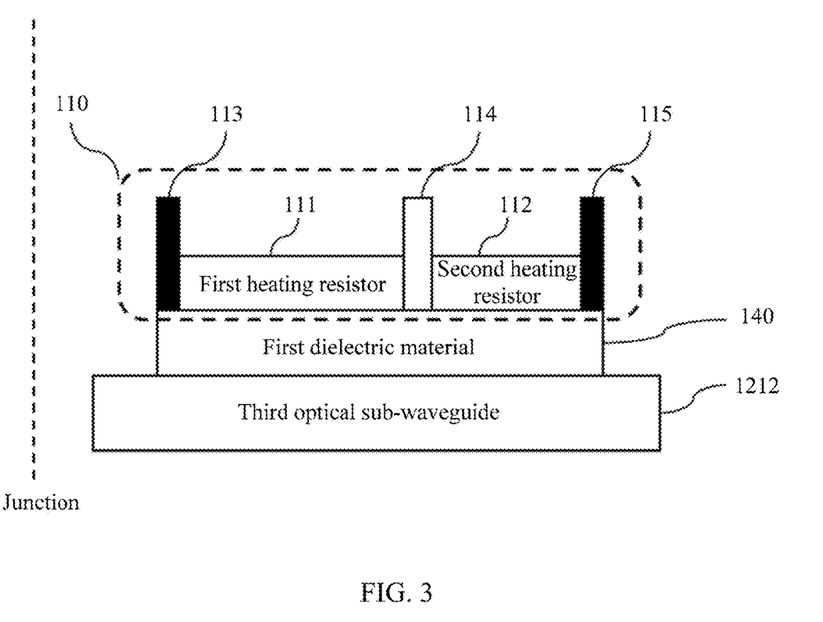
FIG. 3 shows a top view of a heater according to an embodiment of the present disclosure.

Optionally, in another embodiment, as shown in FIG. 3, the first heater 110 includes a first heating resistor 111, a second heating resistor 112, a first electrode 113, a second electrode 114, and a third electrode 115. The first heating resistor 111 is connected to the first dielectric material 140, and the first heating resistor 111 is located between the first electrode 113 and the second electrode 114. The second heating resistor 112 is connected to the first dielectric material 140, and the second heating resistor 112 is located between the second electrode 114 and the third electrode 115. A distance between the first electrode 113 and the junction, a distance between the second electrode 114 and the junction, and a distance between the third electrode 115 and the junction are in ascending order. That is, the distance between the third electrode 115 and the junction is greater than the distance between the second electrode 114 and the junction, and the distance between the second electrode 114 and the junction is greater than the distance between the first electrode 113 and the junction. The first electrode 113 and the third electrode 115 have a same polarity, and the first electrode 113 and the second electrode 114 have opposite polarities. A distance between the first electrode 113 and the second electrode 114 is greater than a distance between the second electrode 114 and the third electrode 115.

The distance between the first electrode 113 and the second electrode 114 is greater than the distance between the second electrode 114 and the third electrode 115, and therefore resistance of the first heating resistor 111 is greater than resistance of the second heating resistor 112, and the second heating resistor 112 has a larger heating power, and transfers a larger amount of heat to the third optical sub-waveguide 1212. That is, from the junction, a temperature of the third optical sub-waveguide 1212 gradually increases, and a temperature difference between the third optical sub-waveguide 1212 and the fourth optical sub-waveguide 1222 also gradually increases. In this way, evolution of an adiabatic mode is implemented, optical coupling efficiency may be improved, and loss and crosstalk may be reduced.

Figure 4:
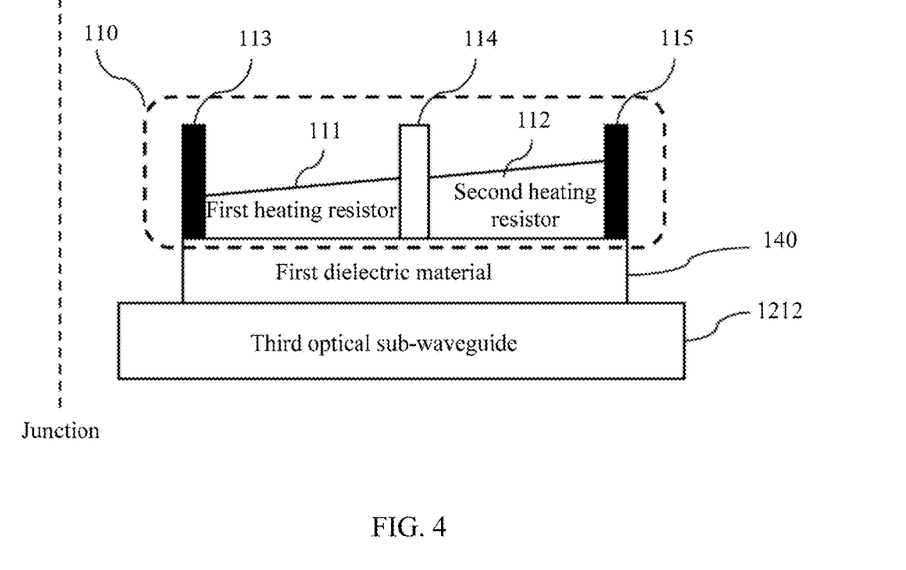
FIG. 4 shows a top view of a heater according to another embodiment of the present disclosure.

Optionally, in another embodiment, as shown in FIG. 4, the first heater 110 includes a first heating resistor 111, a second heating resistor 112, a first electrode 113, a second electrode 114, and a third electrode 115. The first heating resistor 111 is connected to the first dielectric material 140, and the first heating resistor 111 is located between the first electrode 113 and the second electrode 114. The second heating resistor 112 is connected to the first dielectric material 140, and the second heating resistor 112 is located between the second electrode 114 and the third electrode 115. A distance between the first electrode 113 and the junction, a distance between the second electrode 114 and the junction, and a distance between the third electrode 115 and the junction are in ascending order. That is, the distance between the third electrode 115 and the junction is greater than the distance between the second electrode 114 and the junction, and the distance between the second electrode 114 and the junction is greater than the distance between the first electrode 113 and the junction. The first electrode 113 and the third electrode 115 have a same polarity, and the first electrode 113 and the second electrode 114 have opposite polarities. When being closer to the junction, the first heating resistor 111 and the second heating resistor 112 have smaller areas of cross sections that are perpendicular to a transmission direction of a current. That is, for both the first heating resistor 111 and the second heating resistor 112, a cross section at a place that is at a distance from the junction are larger than a cross section at a place that is near the junction. The cross sections are perpendicular to the transmission direction of the current.

When being closer to the junction, the first heating resistor 111 and the second heating resistor 112 have smaller areas of cross sections that are perpendicular to the transmission direction of the current, and an area of a cross section of a heating resistor perpendicular to the transmission direction of the current is inversely proportional to resistance. Therefore, resistance of the first heating resistor 111 is greater than resistance of the second heating resistor 112, the second heating resistor 112 has a larger heating power, and transfers a larger amount of heat to the third optical sub-waveguide 1212. That is, from the junction, a temperature of the third optical sub-waveguide 1212 gradually increases, and a temperature difference between the third optical sub-waveguide 1212 and the fourth optical sub-waveguide 1222 also gradually increases. In this way, evolution of an adiabatic mode is implemented, optical coupling efficiency may be improved, and loss and crosstalk may be reduced.

It should be noted that the heater shown in FIG. 4 is an implementation of the first heater 110, and when being farther away from the junction, the first heating resistor 111 and the second heating resistor 112 that are of a same length are thicker. That is, a cross section perpendicular to the transmission direction of the current at a place that is at a distance from the junction is larger than a cross section perpendicular to the transmission direction of the current at a place that is near the junction. The first heater 110 may further be in another form. This is not limited in this embodiment of the present disclosure.

It should be understood that the first heating resistor 111 and the second heating resistor 112 may be partially connected, or may be completely separated by the second electrode 114. In addition, there may be more heating resistors and electrodes. This is not limited in this embodiment of the present disclosure.

Figure 5:
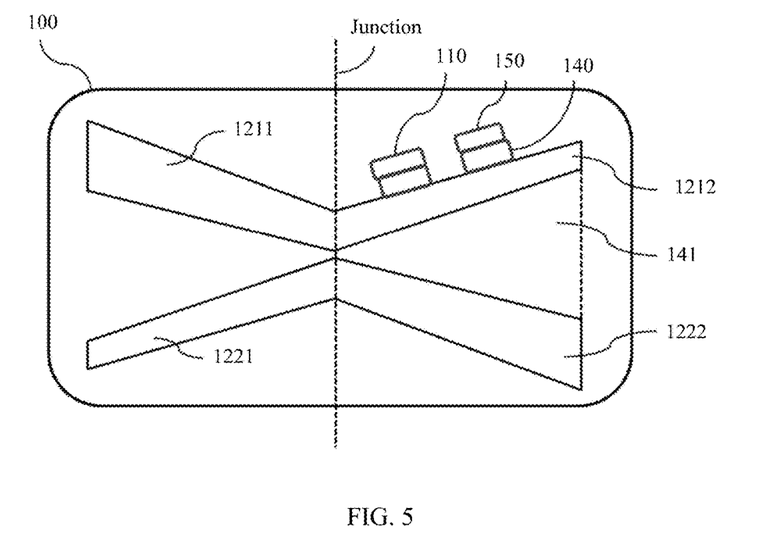
FIG. 5 shows a top view of a digital optical switch according to another embodiment of the present disclosure.

Optionally, in another embodiment, as shown in FIG. 5, the digital optical switch 100 further includes a second heater 150. The second heater 150 is adjacent to the third optical sub-waveguide 1212. There is the first dielectric material 140 between the second heater 150 and the third optical sub-waveguide 1212. A distance between the second heater 150 and the junction is greater than a distance between the first heater 110 and the junction. A heating power of the second heater 150 is greater than a heating power of the first heater 110.

The second heater 150 has a heating power greater than the first heater 110 and is farther away from the junction than the first heater 110, and therefore a temperature difference between the third optical sub-waveguide 1212 and the fourth optical sub-waveguide 1222 may also begin to gradually increase from the junction. In this way, evolution of an adiabatic mode is implemented, optical coupling efficiency is improved, and loss and crosstalk are reduced.

It should be understood that compared with the previous embodiment, structures of the heaters may be relatively simple, and there may be more than two heaters. This is not limited in this embodiment of the present disclosure.

Optionally, in another embodiment, at a place that is closer to the junction, a distance is larger between the first heater 110 and the third optical sub-waveguide 1212. That is, a distance between the first heater 110 and the third optical sub-waveguide 1212 at a place that is at a distance from the junction is less than a distance between the first heater 110 and the third optical sub-waveguide 1212 at a place that is near the junction. From the junction, in a process in which heat is transferred to the third optical sub-waveguide 1212, the first dielectric material 140 that heat needs to pass through gradually reduces, and an amount of heat dissipated in the first dielectric material 140 also gradually reduces. Therefore, a temperature of the third optical sub-waveguide 1212 gradually increases, and a temperature difference between the third optical sub-waveguide 1212 and the fourth optical sub-waveguide 1222 also gradually increases. In this way, evolution of an adiabatic mode is implemented, optical coupling efficiency may be improved, and loss and crosstalk may be reduced.

Optionally, in another embodiment, being adjacent to the third optical sub-waveguide 1212 specifically includes being on an outer side of or above the third optical sub-waveguide 1212. The outer side of the third optical sub-waveguide 1212 is a side not adjacent to the fourth optical sub-waveguide 1222. When the heater is located on the outer side of the third optical sub-waveguide 1212, the heater may be farther away from the fourth optical sub-waveguide 1222, and a temperature difference between the third optical sub-waveguide 1212 and the fourth optical sub-waveguide 1222 may be larger.

Optionally, in another embodiment, when the first heater 110 is operating, an effective refractive index of the third optical sub-waveguide 1212 is greater than an effective refractive index of the fourth optical sub-waveguide 1222, and from the junction, an increasing quantity of light fields of fundamental mode light are distributed in the third optical sub-waveguide 1212, and an increasing quantity of light fields of first-order mode light are distributed in the fourth optical sub-waveguide 1222. When the first heater 110 is not operating, an effective refractive index of the third optical sub-waveguide 1212 is less than an effective refractive index of the fourth optical sub-waveguide 1222, and from the junction, an increasing quantity of light fields of fundamental mode light are distributed in the fourth optical sub-waveguide 1222, and an increasing quantity of light fields of first-order mode light are distributed in the third optical sub-waveguide 1212.

An effective refractive index of an optical waveguide is an important parameter of the optical waveguide, and may be adjusted by changing a width, a height, or a temperature of the optical waveguide. If input light has a same wavelength and a same mode, a higher temperature of the optical waveguide indicates a larger effective refractive index of the optical waveguide; if the width of the optical waveguide does not change, a larger height also indicates a larger effective refractive index of the optical waveguide; and if the height of the optical waveguide does not change, a larger width also indicates a larger effective refractive index of the optical waveguide.

Optionally, in another embodiment, as shown in FIG. 6(*a*), the first optical waveguide 121 and the second optical waveguide 122 have a same height, a width of the first optical sub-waveguide 1211 is greater than a width of the second optical sub-waveguide 1221, and a width difference between the first optical sub-waveguide 1211 and the second optical sub-waveguide 1221 gradually decreases until reaching a minimum at the junction. That is, a width difference between the first optical sub-waveguide 1211 and the second optical sub-waveguide 1221 at a place that is at a distance from the junction is greater than a width difference between the first optical sub-waveguide 1211 and the second optical sub-waveguide 1221 at a place that is near the junction. In this case, an effective refractive index of the first optical sub-waveguide 1211 is greater than an effective refractive index of the second optical sub-waveguide 1221, and a difference between the effective refractive indexes of the first optical sub-waveguide 1211 and the second optical sub-waveguide 1221 gradually decreases until reaching a minimum at the junction, so that when the first heater 110 is not operating, from the junction, an increasing quantity of light fields of fundamental mode light are distributed in the first optical sub-waveguide 1211, and an increasing quantity of light fields of first-order mode light are distributed in the second optical sub-waveguide 1221.

Figure 6A:
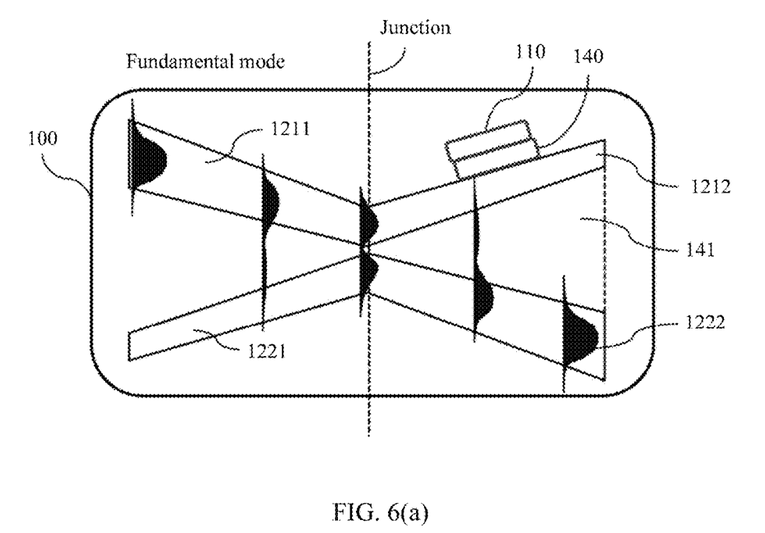

A width of the third optical sub-waveguide 1212 is less than a width of the fourth optical sub-waveguide 1222. From the junction, a width difference between the third optical sub-waveguide 1212 and the fourth optical sub-waveguide 1222 gradually increases. That is, a width difference between the third optical sub-waveguide 1212 and the fourth optical sub-waveguide 1222 at a place that is at a distance from the junction is greater than a width difference between the third optical sub-waveguide 1212 and the fourth optical sub-waveguide 1222 at a place that is near the junction. In this case, an effective refractive index of the third optical sub-waveguide 1212 is less than an effective refractive index of the fourth optical sub-waveguide 1222, and a difference between the effective refractive indexes of the third optical sub-waveguide 1212 and the fourth optical sub-waveguide 1222 gradually decreases until reaching a minimum at the junction, so that when the first heater 110 is not operating, from the junction, an increasing quantity of light fields of the fundamental mode light are distributed in the fourth optical sub-waveguide 1222, and an increasing quantity of light fields of the first-order mode light are distributed in the third optical sub-waveguide 1212.

In this embodiment of the present disclosure, when a width difference is 10 nm or a temperature difference is 100 K, a difference between effective refractive indexes may reach 0.01. When the difference between the effective refractive indexes reaches 0.01, more than 99% of the fundamental mode light is distributed in an optical waveguide with a larger effective refractive index, and more than 99% of the first-order mode light is distributed in an optical waveguide with a smaller effective refractive index.

Specifically, for example, an optical waveguide is made of a Si material. In this embodiment of the present disclosure, a basic principle is that light field distribution of signal light is changed by adjusting an effective refractive index of the optical waveguide, to switch an optical path.

The first optical waveguide 121 and the second optical waveguide 122 have the same height, the width of the first optical sub-waveguide 1211 is greater than the width of the second optical sub-waveguide 1221, and therefore the effective refractive index of the first optical sub-waveguide 1211 is greater than the effective refractive index of the second optical sub-waveguide 1221. After light is input from the first optical sub-waveguide 1211, a symmetric mode is triggered, and the fundamental mode light is generated. As shown in FIG. 6(*a*), when the first optical sub-waveguide 1211 and the second optical sub-waveguide 1221 gradually approach the junction, a distance between the first optical sub-waveguide 1211 and the second optical sub-waveguide 1221 gradually decreases, optical coupling gradually increases, the width difference between the first optical sub-waveguide 1211 and the second optical sub-waveguide 1221 gradually decreases until reaching a minimum at the junction, and the light fields of the fundamental mode light are gradually transferred from the first optical sub-waveguide 1211 which the light fields of the fundamental mode light is limited to, to the second optical sub-waveguide 1221. At the junction, the width difference between the first optical sub-waveguide 1211 and the second optical sub-waveguide 1221 is the smallest, and a fundamental mode light distribution difference between the first optical sub-waveguide 1211 and the second optical sub-waveguide 1221 is also the smallest. From the junction, the width of the third optical sub-waveguide 1212 is less than the width of the fourth optical sub-waveguide 1222, the width difference gradually increases, and therefore the fundamental mode light continues to be transferred to the fourth optical sub-waveguide 1222, and when being output finally, the fundamental mode light is output from the fourth optical sub-waveguide 1222.

Figure 6B:
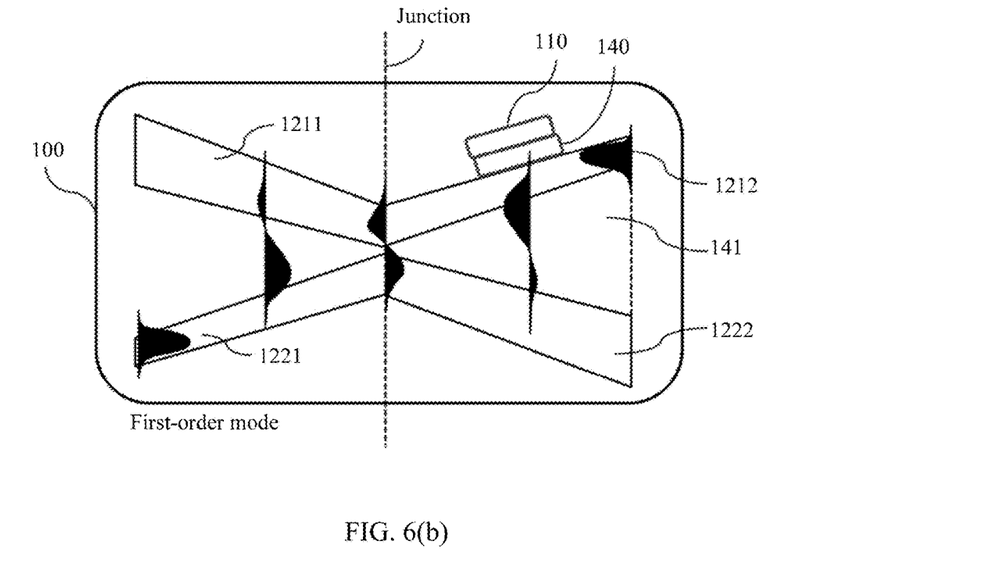

After light is input from the second optical sub-waveguide 1221, an anti-symmetric mode is triggered, and the first-order mode light is generated. As shown in FIG. 6(*b*), when the first optical sub-waveguide 1211 and the second optical sub-waveguide 1221 gradually approach the junction, a distance between the first optical sub-waveguide 1211 and the second optical sub-waveguide 1221 gradually decreases, optical coupling gradually increases, the width difference between the first optical sub-waveguide 1211 and the second optical sub-waveguide 1221 gradually decreases until reaching a minimum at the junction, the light fields of the first-order mode light are gradually transferred from the second optical sub-waveguide 1221 to the first optical sub-waveguide 1211, and a reverse light field component is formed in the first optical sub-waveguide 1211, where the light fields of the first-order mode light are originally distributed only in the second optical sub-waveguide 1221. At the junction, the width difference between the first optical sub-waveguide 1211 and the second optical sub-waveguide 1221 is the smallest, and a first-order mode light distribution difference between the first optical sub-waveguide 1211 and the second optical sub-waveguide 1221 is also the smallest. From the junction, the width of the third optical sub-waveguide 1212 is less than the width of the fourth optical sub-waveguide 1222, the width difference gradually increases, and therefore the first-order mode light continues to be transferred to the third optical sub-waveguide 1212, and when being output finally, the first-order mode light is output from the third optical sub-waveguide 1212.

In this case, the digital optical switch 100 is in a cross-connect state, and the first heater 110 does not need to operate, thereby reducing control complexity and power consumption.

It should be understood that forward and reverse light fields are relative concepts and affect neither light energy nor information carried. Therefore, in FIG. 6(*b*), an optical signal input from the second optical sub-waveguide 1221 is equivalent to an optical signal output from the third optical sub-waveguide 1212. In addition, lights input from the first optical sub-waveguide 1211 and the second optical sub-waveguide 1221 do not affect each other.

Figure 6C:
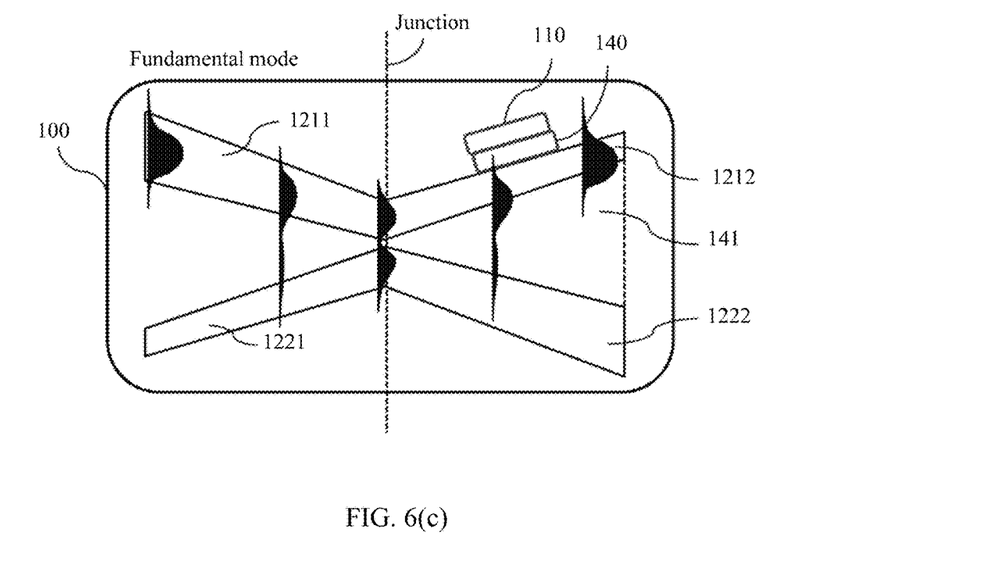
Figure 6D:
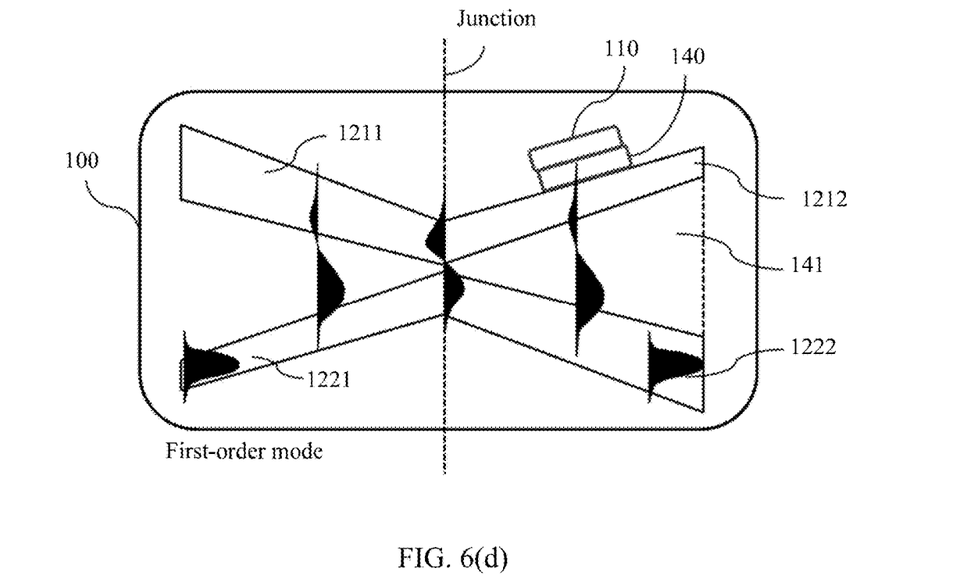

When the first heater 110 starts to operate, a temperature of the third optical sub-waveguide 1212 rises. The effective refractive index of the optical waveguide that is made of the Si material increases with an increasing temperature, and therefore the effective refractive index of the third optical sub-waveguide 1212 is greater than the effective refractive index of the fourth optical sub-waveguide 1222. Referring to light field distribution manners described above, as shown in FIG. 6(*c*) and FIG. 6(*d*), the light input from the first optical sub-waveguide 1211 is output from the third optical sub-waveguide 1212, and the light input from the second optical sub-waveguide 1221 is output from the fourth optical sub-waveguide 1222. The digital optical switch 100 operates in a straight-through state. In this case, for the digital optical switch 100, only the first heater 110 needs to operate. That is, in this embodiment of the present disclosure, only one heater is required in total, thereby reducing control complexity and power consumption.

Figure 7:
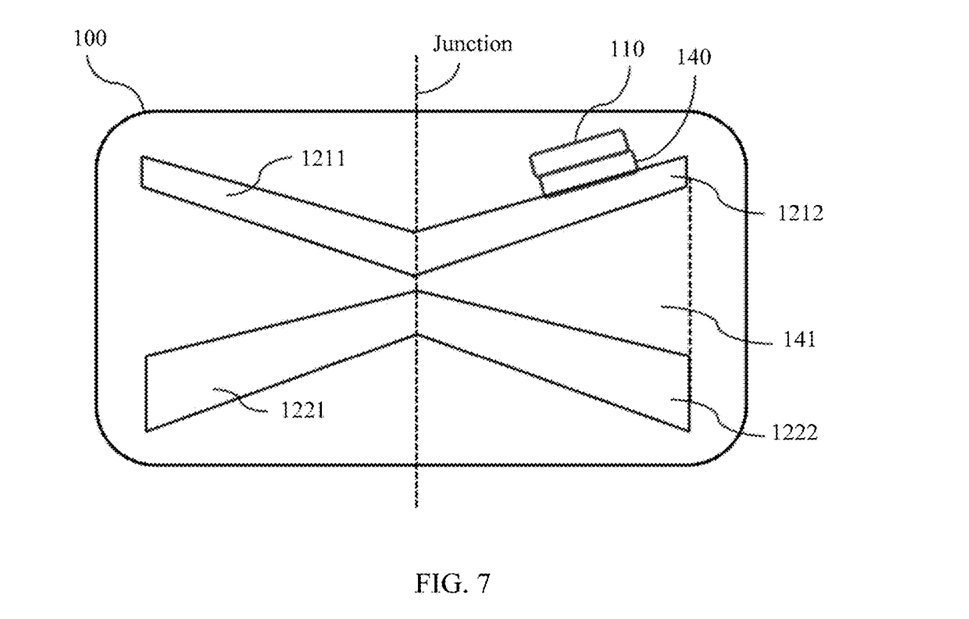
FIG. 7 shows a top view of a digital optical switch according to another embodiment of the present disclosure.

Optionally, in another embodiment, as shown in FIG. 7, the first optical waveguide 121 and the second optical waveguide 122 have a same height, a width of the first optical sub-waveguide 1211 is less than a width of the second optical sub-waveguide 1221, and a width difference between the first optical sub-waveguide 1211 and the second optical sub-waveguide 1221 gradually decreases until reaching a minimum at the junction. That is, a width difference between the first optical sub-waveguide 1211 and the second optical sub-waveguide 1221 at a place that is at a distance from the junction is greater than a width difference between the first optical sub-waveguide 1211 and the second optical sub-waveguide 1221 at a place that is near the junction. In this case, an effective refractive index of the first optical sub-waveguide 1211 is less than an effective refractive index of the second optical sub-waveguide 1221, and a difference between the effective refractive indexes of the first optical sub-waveguide 1211 and the second optical sub-waveguide 1221 gradually decreases until reaching a minimum at the junction, so that when the first heater 110 is not operating, from the junction, an increasing quantity of light fields of fundamental mode light are distributed in the first optical sub-waveguide 1211, and an increasing quantity of light fields of first-order mode light are distributed in the second optical sub-waveguide 1221.

A width of the third optical sub-waveguide 1212 is less than a width of the fourth optical sub-waveguide 1222. From the junction, a width difference between the third optical sub-waveguide 1212 and the fourth optical sub-waveguide 1222 gradually increases. That is, a width difference between the third optical sub-waveguide 1212 and the fourth optical sub-waveguide 1222 at a place that is at a distance from the junction is greater than a width difference between the third optical sub-waveguide 1212 and the fourth optical sub-waveguide 1222 at a place that is near the junction. In this case, an effective refractive index of the third optical sub-waveguide 1212 is less than an effective refractive index of the fourth optical sub-waveguide 1222, and a difference between the effective refractive indexes of the third optical sub-waveguide 1212 and the fourth optical sub-waveguide 1222 gradually decreases until reaching a minimum at the junction, so that when the first heater 110 is not operating, from the junction, an increasing quantity of light fields of the fundamental mode light are distributed in the third optical sub-waveguide 1212, and an increasing quantity of light fields of the first-order mode light are distributed in the fourth optical sub-waveguide 1222.

Figure 8:
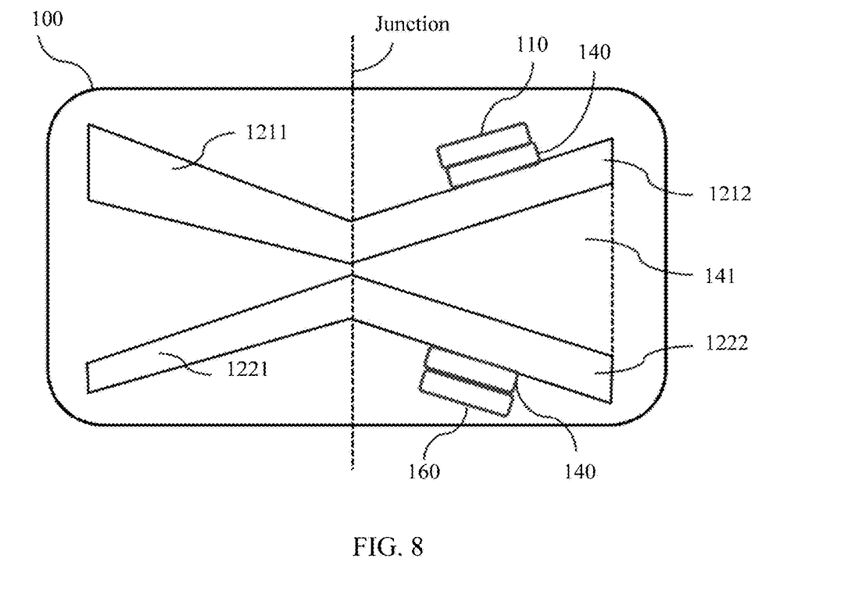
FIG. 8 shows a top view of a digital optical switch according to another embodiment of the present disclosure.

Optionally, in another embodiment, as shown in FIG. 8, the first optical waveguide 121 and the second optical waveguide 122 have a same height, a width of the first optical sub-waveguide 1211 is greater than a width of the second optical sub-waveguide 1221, and a width difference between the first optical sub-waveguide 1211 and the second optical sub-waveguide 1221 gradually decreases until reaching a minimum at the junction. That is, a width difference between the first optical sub-waveguide 1211 and the second optical sub-waveguide 1221 at a place that is at a distance from the junction is greater than a width difference between the first optical sub-waveguide 1211 and the second optical sub-waveguide 1221 at a place that is near the junction. In this case, an effective refractive index of the first optical sub-waveguide 1211 is greater than an effective refractive index of the second optical sub-waveguide 1221, and a difference between the effective refractive indexes of the first optical sub-waveguide 1211 and the second optical sub-waveguide 1221 gradually decreases until reaching a minimum at the junction, so that when the first heater 110 is not operating, from the junction, an increasing quantity of light fields of fundamental mode light are distributed in the first optical sub-waveguide 1211, and an increasing quantity of light fields of first-order mode light are distributed in the second optical sub-waveguide 1221.

Widths of the third optical sub-waveguide 1212 and the fourth optical sub-waveguide 1222 remain unchanged. In this case, when the first heater 110 is not operating, effective refractive indexes of the third optical sub-waveguide 1212 and the fourth optical sub-waveguide 1222 are basically the same.

Specifically, for example, an optical waveguide is made of a Si material. The first optical waveguide 121 and the second optical waveguide 122 have the same height, the width of the first optical sub-waveguide 1211 is greater than the width of the second optical sub-waveguide 1221, and therefore the effective refractive index of the first optical sub-waveguide 1211 is greater than the effective refractive index of the second optical sub-waveguide 1221. After light is input from the first optical sub-waveguide 1211, a symmetric mode is triggered, and the fundamental mode light is generated. When the first optical sub-waveguide 1211 and the second optical sub-waveguide 1221 gradually approach the junction, a distance between the first optical sub-waveguide 1211 and the second optical sub-waveguide 1221 gradually decreases, optical coupling gradually increases, the width difference between the first optical sub-waveguide 1211 and the second optical sub-waveguide 1221 gradually decreases until reaching a minimum at the junction, and the light fields of the fundamental mode light are gradually transferred from the first optical sub-waveguide 1211 to the second optical sub-waveguide 1221, where the light fields of the fundamental mode light are originally distributed only in the first optical sub-waveguide 1211. At the junction, the width difference between the first optical sub-waveguide 1211 and the second optical sub-waveguide 1221 is the smallest, and a fundamental mode light distribution difference between the first optical sub-waveguide 1211 and the second optical sub-waveguide 1221 is also the smallest. In this case, the first heater 110 is started, the effective refractive index of the third optical sub-waveguide 1212 is greater than the effective refractive index of the fourth optical sub-waveguide 1222, the fundamental mode light continues to be transferred to the third optical sub-waveguide 1212, and when being output finally, the fundamental mode light is output from the third optical sub-waveguide 1212.

After light is input from the second optical sub-waveguide 1221, an anti-symmetric mode is triggered, and the first-order mode light is generated. When the first optical sub-waveguide 1211 and the second optical sub-waveguide 1221 gradually approach the junction, a distance between the first optical sub-waveguide 1211 and the second optical sub-waveguide 1221 gradually decreases, optical coupling gradually increases, the width difference between the first optical sub-waveguide 1211 and the second optical sub-waveguide 1221 gradually decreases until reaching a minimum at the junction, the light fields of the first-order mode light are gradually transferred from the second optical sub-waveguide 1221 to the first optical sub-waveguide 1211, and a reverse light field component is formed in the first optical sub-waveguide 1211, where the light fields of the first-order mode light are originally distributed only in the second optical sub-waveguide 1221. At the junction, the width difference between the first optical sub-waveguide 1211 and the second optical sub-waveguide 1221 is the smallest, and a first-order mode light distribution difference between the first-order mode light in the first optical sub-waveguide 1211 and the second optical sub-waveguide 1221 is also the smallest. The first heater 110 is started, the effective refractive index of the third optical sub-waveguide 1212 is greater than the effective refractive index of the fourth optical sub-waveguide 1222, the first-order mode light continues to be transferred to the fourth optical sub-waveguide 1222, and when being output finally, the first-order mode light is output from the fourth optical sub-waveguide 1222.

In this case, the digital optical switch 100 is in a straight-through state, and only the first heater 110 needs to operate, thereby reducing control complexity and power consumption.

Optionally, in another embodiment, the digital optical switch 100 further includes a third heater 160. The third heater 160 is adjacent to the fourth optical sub-waveguide 1222.

When the first heater 110 is not operating and the third heater 160 is operating, the third heater 160 provides heat for the fourth optical sub-waveguide 1222. An effective refractive index of a Si material increases with a temperature, and therefore an effective refractive index of the fourth optical sub-waveguide 1222 is greater than an effective refractive index of the third optical sub-waveguide 1212. Referring to light field distribution manners described above, light input from the first optical sub-waveguide 1211 is output from the fourth optical sub-waveguide 1222, and light input from the second optical sub-waveguide 1221 is output from the third optical sub-waveguide 1212. The digital optical switch 100 operates in a cross-connect state. In this case, only the third heater 160 needs to operate in this embodiment of the present disclosure. That is, in this embodiment of the present disclosure, two heaters are required in total, but only one heater needs to be in an operating state at a time, thereby reducing control complexity and power consumption. Compared with the previous embodiment in which only the first heater 110 is required, under a condition that the digital optical switches are of a same size, this embodiment of the present disclosure has a relatively low requirement for temperatures of the first heater 110 and the third heater 160, and is easier to implement.

Optionally, in another embodiment, when the first heater 110 is operating and the third heater 160 is not operating, an effective refractive index of the third optical sub-waveguide 1212 is greater than an effective refractive index of the fourth optical sub-waveguide 1222, and from the junction, an increasing quantity of light fields of fundamental mode light are distributed in the third optical sub-waveguide 1212, and an increasing quantity of light fields of first-order mode light are distributed in the fourth optical sub-waveguide 1222. When the first heater 110 is not operating and the third heater 160 is operating, an effective refractive index of the third optical sub-waveguide 1212 is less than an effective refractive index of the fourth optical sub-waveguide 1222, and from the junction, an increasing quantity of light fields of fundamental mode light are distributed in the fourth optical sub-waveguide 1222, and an increasing quantity of light fields of first-order mode light are distributed in the third optical sub-waveguide 1212.

Optionally, in another embodiment, being adjacent to the fourth optical sub-waveguide 1222 specifically includes being on an outer side of or above the fourth optical sub-waveguide 1222. The outer side of the fourth optical sub-waveguide 1222 is a side not adjacent to the third optical sub-waveguide 1212. When the third heater 160 is located on the outer side of the fourth optical sub-waveguide 1222, the third heater 160 may be farther away from the third optical sub-waveguide 1212, and a temperature difference between the third optical sub-waveguide 1212 and the fourth optical sub-waveguide 1222 may be larger.

Optionally, in another embodiment, there is the first dielectric material 140 between the third heater 160 and the fourth optical sub-waveguide 1222. A material with a high thermal conductivity is used as the first dielectric material 140 to improve heating efficiency.

Optionally, in another embodiment, the first optical waveguide 121 and the second optical waveguide 122 have a same width, a height of the first optical sub-waveguide 1211 is greater than a height of the second optical sub-waveguide 1221, and a height difference between the first optical sub-waveguide 1211 and the second optical sub-waveguide 1221 gradually decreases until reaching a minimum at the junction. That is, a height difference between the first optical sub-waveguide 1211 and the second optical sub-waveguide 1221 at a place that is at a distance from the junction is greater than a height difference between the first optical sub-waveguide 1211 and the second optical sub-waveguide 1221 at a place that is near the junction, so that when the first heater 110 is not operating, from the junction, an increasing quantity of light fields of fundamental mode light are distributed in the first optical sub-waveguide 1211, and an increasing quantity of light fields of first-order mode light are distributed in the second optical sub-waveguide 1221. In this case, an effective refractive index of the first optical sub-waveguide 1211 is greater than an effective refractive index of the second optical sub-waveguide 1221, and a difference between the effective refractive indexes of the first optical sub-waveguide 1211 and the second optical sub-waveguide 1221 gradually decreases until reaching a minimum at the junction.

A height of the third optical sub-waveguide 1212 is less than a height of the fourth optical sub-waveguide 1222. From the junction, a height difference between the third optical sub-waveguide 1212 and the fourth optical sub-waveguide 1222 gradually increases. That is, a height difference between the third optical sub-waveguide 1212 and the fourth optical sub-waveguide 1222 at a place that is at a distance from the junction is greater than a height difference between the third optical sub-waveguide 1212 and the fourth optical sub-waveguide 1222 at a place that is near the junction. In this case, an effective refractive index of the third optical sub-waveguide 1212 is less than an effective refractive index of the fourth optical sub-waveguide 1222, and a difference between the effective refractive indexes of the third optical sub-waveguide 1212 and the fourth optical sub-waveguide 1222 gradually decreases until reaching a minimum at the junction, so that when the first heater 110 is not operating, from the junction, an increasing quantity of light fields of the fundamental mode light are distributed in the fourth optical sub-waveguide 1222, and an increasing quantity of light fields of the first-order mode light are distributed in the third optical sub-waveguide 1212.

When optical waveguides have a same width, a larger height of an optical waveguide indicates a larger effective refractive index. Therefore, the effective refractive index of the first optical sub-waveguide 1211 is greater than the effective refractive index of the second optical sub-waveguide 1221. After light is input from the first optical sub-waveguide 1211, a symmetric mode is triggered, and the fundamental mode light is generated. After light is input from the second optical sub-waveguide 1221, an anti-symmetric mode is triggered, and the first-order mode light is generated. A specific working process has been described in detail in the previous embodiment, and details are not described in this embodiment of the present disclosure.

Optionally, in another embodiment, the first optical waveguide 121 and the second optical waveguide 122 have a same width, a height of the first optical sub-waveguide 1211 is less than a height of the second optical sub-waveguide 1221, and a height difference between the first optical sub-waveguide 1211 and the second optical sub-waveguide 1221 gradually decreases until reaching a minimum at the junction. That is, a height difference between the first optical sub-waveguide 1211 and the second optical sub-waveguide 1221 at a place that is at a distance from the junction is greater than a height difference between the first optical sub-waveguide 1211 and the second optical sub-waveguide 1221 at a place that is near the junction, so that when the first heater 110 is not operating, from the junction, an increasing quantity of light fields of fundamental mode light are distributed in the first optical sub-waveguide 1211, and an increasing quantity of light fields of first-order mode light are distributed in the second optical sub-waveguide 1221.

A height of the third optical sub-waveguide 1212 is less than a height of the fourth optical sub-waveguide 1222. From the junction, a height difference between the third optical sub-waveguide 1212 and the fourth optical sub-waveguide 1222 gradually increases. That is, a height difference between the third optical sub-waveguide 1212 and the fourth optical sub-waveguide 1222 at a place that is at a distance from the junction is greater than a height difference between the third optical sub-waveguide 1212 and the fourth optical sub-waveguide 1222 at a place that is near the junction, so that when the first heater 110 is not operating, from the junction, an increasing quantity of light fields of the fundamental mode light are distributed in the third optical sub-waveguide 1212, and an increasing quantity of light fields of the first-order mode light are distributed in the fourth optical sub-waveguide 1222.

Optionally, in another embodiment, the first optical waveguide 121 and the second optical waveguide 122 have a same width, a height of the first optical sub-waveguide 1211 is greater than a height of the second optical sub-waveguide 1221, and a height difference between the first optical sub-waveguide 1211 and the second optical sub-waveguide 1221 gradually decreases until reaching a minimum at the junction. That is, a height difference between the first optical sub-waveguide 1211 and the second optical sub-waveguide 1221 at a place that is at a distance from the junction is greater than a height difference between the first optical sub-waveguide 1211 and the second optical sub-waveguide 1221 at a place that is near the junction, so that when the first heater 110 is not operating, from the junction, an increasing quantity of light fields of fundamental mode light are distributed in the first optical sub-waveguide 1211, and an increasing quantity of light fields of first-order mode light are distributed in the second optical sub-waveguide 1221. Heights of the third optical sub-waveguide 1212 and the fourth optical sub-waveguide 1222 remain unchanged. If neither the first heater 110 nor the third heater 160 is operating, effective refractive indexes of the third optical sub-waveguide 1212 and the fourth optical sub-waveguide 1222 are basically equal.

In this embodiment of the present disclosure, two heaters are required in total, but only one heater needs to be in an operating state at a time, thereby reducing control complexity and power consumption. Compared with the previous embodiment in which only the first heater 110 is required, under a condition that the digital optical switches are of a same size, this embodiment of the present disclosure has a relatively low requirement for temperatures of the first heater 110 and the third heater 160, and is easier to implement. A specific working process has been described in detail in the previous embodiments, and details are not described in this embodiment of the present disclosure.

It should be understood that in the foregoing embodiments of the present disclosure, a digital optical switch is used as an example for description, but the embodiments of the present disclosure are not limited to the digital optical switch.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical switch, comprising:
   a first optical waveguide comprising a first optical sub-waveguide and a third optical sub-waveguide;
   a second optical waveguide comprising a second optical sub-waveguide and a fourth optical sub-waveguide, wherein the first optical waveguide and the second optical waveguide have a junction therebetween;
   a first heater disposed adjacent the third optical sub-waveguide;
   a first dielectric material disposed between the first heater and the third optical sub-waveguide; and
   a second dielectric material disposed between the third optical sub-waveguide and the fourth optical sub-waveguide, wherein a thermal conductivity of the first dielectric material is greater than a thermal conductivity of the second dielectric material,
   wherein the first optical waveguide and the second optical waveguide have a same height, a width of the first optical sub-waveguide is different from a width of the second optical sub-waveguide, and a width difference between the first optical sub-waveguide and the second optical sub-waveguide at a place that is at a distance from the junction is greater than a width difference between the first optical sub-waveguide and the second optical sub-waveguide at a place that is near the junction.

2. The optical switch according to claim 1, wherein when the first heater is operating, a temperature of the third optical sub-waveguide at a place that is at a first distance from the junction is higher than a temperature of the third optical sub-waveguide at a place that is near the junction.

3. The optical switch according to claim 1, further comprising:
   a second heater disposed adjacent to the third optical sub-waveguide, wherein the first dielectric material is disposed between the second heater and the third optical sub-waveguide, a distance between the second heater and the junction is greater than a distance between the first heater and the junction, and a heating power of the second heater is greater than a heating power of the first heater.

4. The optical switch according to claim 1, wherein a distance between the first heater and the third optical sub-waveguide at a place that is at a distance from the junction is less than a distance between the first heater and the third optical sub-waveguide at a place that is near the junction.

5. The optical switch according to claim 1, wherein the first heater is disposed on an outer side of or above the third optical sub-waveguide, wherein the outer side of the third optical sub-waveguide is a side not adjacent to the fourth optical sub-waveguide.

6. The optical switch according to claim 1, wherein when the first heater is operating, an effective refractive index of the third optical sub-waveguide is greater than an effective refractive index of the fourth optical sub-waveguide, and when the first heater is not operating, an effective refractive index of the third optical sub-waveguide is less than an effective refractive index of the fourth optical sub-waveguide.

7. The optical switch according to claim 1, wherein:
   the width of the first optical sub-waveguide is greater than the width of the second optical sub-waveguide; and
   a width of the third optical sub-waveguide is less than a width of the fourth optical sub-waveguide, and a width difference between the third optical sub-waveguide and the fourth optical sub-waveguide at a place that is at a distance from the junction is greater than a width difference between the third optical sub-waveguide and the fourth optical sub-waveguide at a place that is near the junction.

8. The optical switch according to claim 1, wherein:
   the width of the first optical sub-waveguide is less than the width of the second optical sub-waveguide; and
   a width of the third optical sub-waveguide is less than a width of the fourth optical sub-waveguide, and a width difference between the third optical sub-waveguide and the fourth optical sub-waveguide at a place that is at a distance from the junction is greater than a width difference between the third optical sub-waveguide and the fourth optical sub-waveguide at a place that is near the junction.

9. The optical switch according to claim 1, wherein:
   the width of the first optical sub-waveguide is greater than the width of the second optical sub-waveguide.

10. The optical switch according to claim 1, further comprising:
    a second heater disposed adjacent the fourth optical sub-waveguide.

11. The optical switch according to claim 10, wherein:
    when the first heater is operating and the second heater is not operating, an effective refractive index of the third optical sub-waveguide is greater than an effective refractive index of the fourth optical sub-waveguide; and
    when the first heater is not operating and the second heater is operating, an effective refractive index of the third optical sub-waveguide is less than an effective refractive index of the fourth optical sub-waveguide.

12. The optical switch according to claim 10, wherein the second heater is disposed on an outer side of or above the fourth optical sub-waveguide, wherein the outer side of the fourth optical sub-waveguide is a side not adjacent to the third optical sub-waveguide.

13. The optical switch according to claim 10, wherein the first dielectric material is disposed between the second heater and the fourth optical sub-waveguide.

14. An optical switch, comprising:
    a first optical waveguide comprising a first optical sub-waveguide and a third optical sub-waveguide;

a second optical waveguide comprising a second optical sub-waveguide and a fourth optical sub-waveguide, wherein the first optical waveguide and the second optical waveguide have a junction therebetween;

a first heater disposed adjacent the third optical sub-waveguide;

a first dielectric material disposed between the first heater and the third optical sub-waveguide; and a second dielectric material disposed between the third optical sub-waveguide and the fourth optical sub-waveguide, wherein a thermal conductivity of the first dielectric material is greater than a thermal conductivity of the second dielectric material, wherein the first heater comprises:

a first electrode, a second electrode, and a third electrode;

a first heating resistor connected to the first dielectric material and disposed between the first electrode and the second electrode;

a second heating resistor connected to the first dielectric material and disposed between the second electrode and the third electrode; and wherein a distance between the second electrode and the junction is greater than a distance between the first electrode and the junction, a distance between the third electrode and the junction is greater than the distance between the second electrode and the junction, the first electrode and the third electrode have a same polarity, and the first electrode and the second electrode have opposite polarities, wherein a distance between the first electrode and the second electrode is greater than a distance between the second electrode and the third electrode.

15. An optical switch, comprising:
a first optical waveguide comprising a first optical sub-waveguide and a third optical sub-waveguide;
a second optical waveguide comprising a second optical sub-waveguide and a fourth optical sub-waveguide, wherein the first optical waveguide and the second optical waveguide have a junction therebetween;
a first heater disposed adjacent the third optical sub-waveguide;
a first dielectric material disposed between the first heater and the third optical sub-waveguide; and
a second dielectric material disposed between the third optical sub-waveguide and the fourth optical sub-waveguide, wherein a thermal conductivity of the first dielectric material is greater than a thermal conductivity of the second dielectric material, wherein the first heater comprises:
a first electrode, a second electrode, and a third electrode;
a first heating resistor connected to the first dielectric material and disposed between the first electrode and the second electrode;
a second heating resistor connected to the first dielectric material and disposed between the second electrode and the third electrode; and
wherein a distance between the second electrode and the junction is greater than a distance between the first electrode and the junction, a distance between the third electrode and the junction is greater than the distance between the second electrode and the junction, the first electrode and the third electrode have a same polarity, and the first electrode and the second electrode have opposite polarities, wherein cross sections of the first heating resistor and the second heating resistor at a place that is at a distance from the junction are larger than cross sections of the first heating resistor and the second heating resistor at a place that is near the junction, and the cross sections are perpendicular to a transmission direction of a current.

16. An optical switch, comprising:
a first optical waveguide comprising a first optical sub-waveguide and a third optical sub-waveguide;
a second optical waveguide comprising a second optical sub-waveguide and a fourth optical sub-waveguide, wherein the first optical waveguide and the second optical waveguide have a junction therebetween;
a first heater disposed adjacent the third optical sub-waveguide;
a first dielectric material disposed between the first heater and the third optical sub-waveguide; and
a second dielectric material disposed between the third optical sub-waveguide and the fourth optical sub-waveguide, wherein a thermal conductivity of the first dielectric material is greater than a thermal conductivity of the second dielectric material, wherein:
the first optical waveguide and the second optical waveguide have a same width, a height of the first optical sub-waveguide is different from a height of the second optical sub-waveguide, and a height difference between the first optical sub-waveguide and the second optical sub-waveguide at a place that is at a distance from the junction is greater than a height difference between the first optical sub-waveguide and the second optical sub-waveguide at a place that is near the junction.

17. The optical switch according to claim 16, wherein:
the height of the first optical sub-waveguide is greater than a height of the second optical sub-waveguide; and
a height of the third optical sub-waveguide is less than a height of the fourth optical sub-waveguide, and a height difference between the third optical sub-waveguide and the fourth optical sub-waveguide at a place that is at a distance from the junction is greater than a height difference between the third optical sub-waveguide and the fourth optical sub-waveguide at a place that is near the junction.

18. The optical switch according to claim 16, wherein:
the height of the first optical sub-waveguide is less than a height of the second optical sub-waveguide; and
a height of the third optical sub-waveguide is less than a height of the fourth optical sub-waveguide, and a height difference between the third optical sub-waveguide and the fourth optical sub-waveguide at a place that is at a distance from the junction is greater than a height difference between the third optical sub-waveguide and the fourth optical sub-waveguide at a place that is near the junction.

* * * * *